Patented Oct. 22, 1935

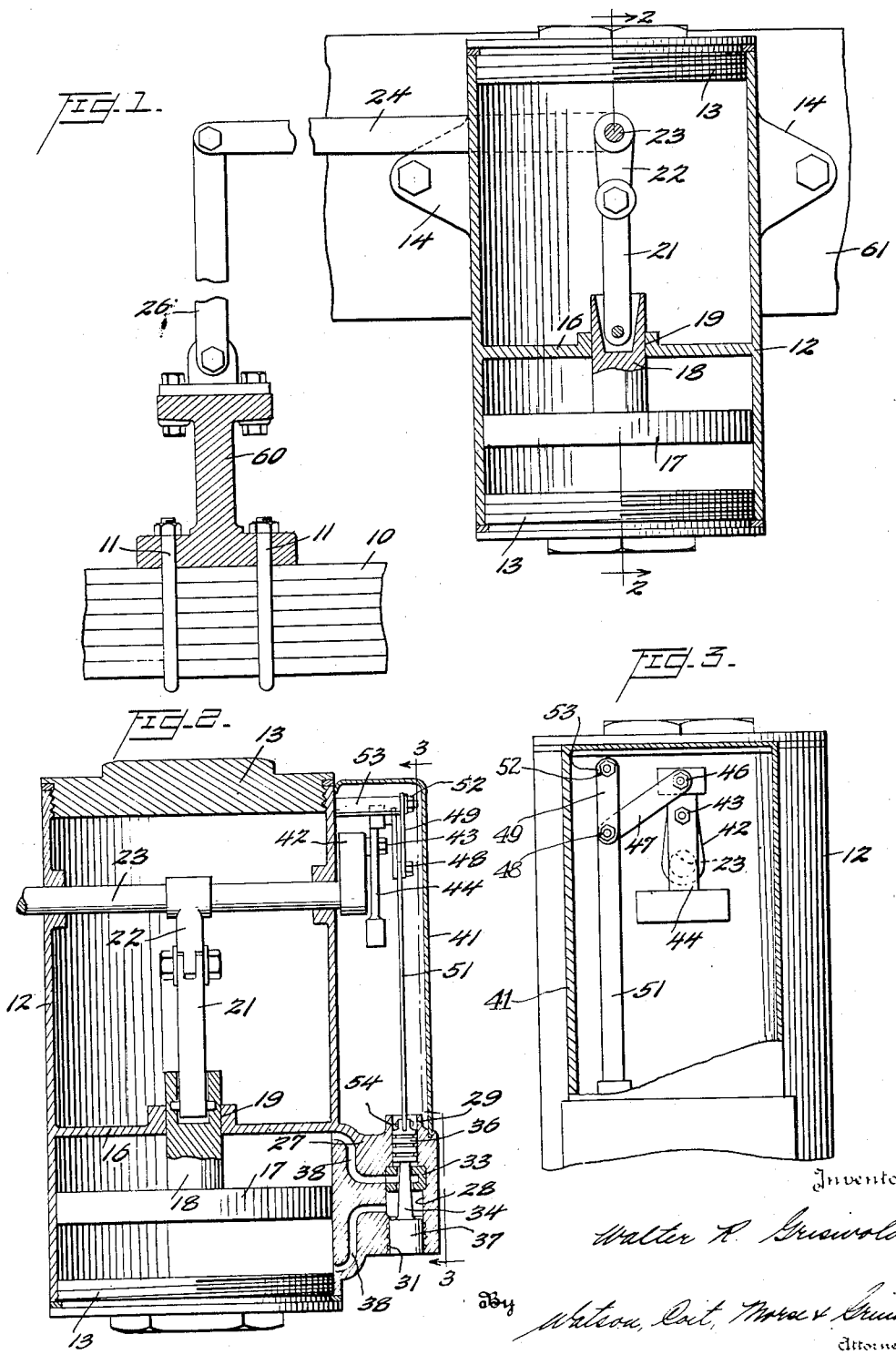

2,017,963

UNITED STATES PATENT OFFICE 2,017,963

VIBRATION DAMPER

Walter R. Griswold, Detroit, Mich., assignor to Packard Motor Car Company, Detroit, Mich., a corporation of Michigan Original application June 27, 1925, Serial No. 39,896. Divided and this application December 2, 1931, Serial No. 578,520½. Renewed May 20, 1935

19 Claims. (Cl. 188—88)

This invention relates to apparatus for damping vibrations in motor vehicles, and is particularly concerned with the suppression of vibratory movement of the vehicle body with respect to the supporting axle or axles.

It is customary to support the vehicle frame resiliently on the axle and the springs commonly used for this purpose are not perfectly elastic. Thus while these springs are capable of absorbing those disturbances applied somewhat gradually to the vehicle axle, when the vehicle is driven rapidly over uneven ground so that the axle is subjected to sudden shocks, a considerable proportion of such shocks are transmitted to the vehicle frame. Furthermore, the frame constitutes a body of considerable inertia resiliently mounted and there is thus a tendency to set this body in vibration on the springs, this vibration proving particularly disturbing as the system, comprising the frame and springs, approaches a condition of vibratory resonance.

It is thus desirable to permit flexure of the springs in response to the more gradually applied road shocks and to resist to a greater extent flexure of the springs in response to shocks more suddenly applied.

It will be observed that the more sudden shocks tend to produce greater acceleration of movement of the springs, or in other words, greater acceleration of the frame and axle with respect to each other. Thus the most efficient type of shock absorber is one in which the resistance to shock increases in some proportion with the relative acceleration of the frame and axle, since the ability of the springs to absorb the energy of road shocks is inversely proportional to the rate of change of relative movement of the frame and axle.

It is therefore an object of the invention to provide means for resisting relative movement of the vehicle frame and axle, or alternatively, flexure of the vehicle springs, the degree of resistance offered by such means being controlled by the relative acceleration of the axle and frame or accelerative movement of the springs.

A further object of the invention is the provision in a vehicle of a shock absorbing device connected between the axle and the vehicle frame, and means responsive to vibratory acceleration of the frame and axle for controlling the shock absorbing capacity of the device. It is a feature of the invention that the controlling means is coupled to and operable by the connections between the shock absorbing device and the frame and axle.

It is a further feature of the invention that the controlling means for the shock absorbing device is responsive to sudden variation in the speed of forward movement of the vehicle, the arrangement being such that when the forward motion of the vehicle is abruptly retarded, for instance on application of the vehicle brakes, the resistance which the shock absorbing device offers to spring flexure is immediately increased, whereby undesirable dipping of the forward end of the vehicle may be avoided.

Further objects and features of the invention will be apparent from the following description taken in connection with the accompanying drawing, in which Figure 1 is a vertical sectional view through a shock absorber to which the present invention may be applied;

Figure 2 is a sectional view on the line 2—2 of Figure 1; and

Figure 3 is a view partly in side elevation and partly in section on the line 3—3 of Figure 2.

This application is a division of my prior filed application, Serial No. 39,896, filed June 27, 1925.

For the purpose of illustration, the invention has been shown in a form adapted to damp the vibration of one of the front springs of a vehicle, but it is to be understood that it is equally applicable to rear springs, and that it is as applicable to transverse as it is longitudinally arranged springs. It will also be appreciated that the specific form of shock absorber illustrated herein comprises one embodiment only of the invention and that the principles of the invention are applicable to other types of shock absorbers, and that various other alterations and modifications of the form of the invention specifically described herein are contemplated.

In this device, 10 represents a portion of one of the front springs of the vehicle, which is suspended from the axle 60 thereof by the U-bolts or clips 11, and which is adapted to support the vehicle frame member 61 through shackles or other suitable connections (not shown) in the well known manner. The axle may carry the conventional wheel assembly at each end thereof. The shock absorber shown comprises a cylindrical housing 12, closed by removable heads 13 and provided with suitable ears 14 by which it is bolted or otherwise secured to the frame member 61. The housing 12 is divided transversely by a partition 16 into upper and lower chambers, and a piston 17 is slidably mounted in the lower chamber, which is filled with a suitable fluid such as oil, in fluid-tight relation to the cylindrical walls 12. This piston 17 is formed with a stem portion 18 slidably mounted in a central opening 19 in the partition 16, and projecting therethrough into the upper chamber. This stem portion is pivotally connected by means of a rod 21 to the extremity of a lever arm 22, rigidly secured to a shaft 23 which is journalled in suitable bearings transversely of the upper chamber and near the head 13. This shaft projects through the housing 12 on each side. One of its ends is provided with a lever arm 24, outside the casing 12, which is connected by a link 26 to the axle 60 of the vehicle. It will thus be evident that movements of the axle with respect to the vehicle frame, caused by compression and recoil of the vehicle spring, will be communicated through the link 26 and arm 24 to the shaft 23, causing oscillatory movement thereof, and from the shaft through the arm 22 and rod 21 to the piston 17 which is given a corresponding reciprocatory movement in the cylinder 12. It will also be evident that since these parts are connected together, the shaft 23 and the piston 17 will have, at any given moment during spring motion, a velocity and an acceleration proportional respectively to the velocity and acceleration of the spring.

The housing 12 is formed with an external lug 27 on the side thereof opposite the lever arm 24, which lug is formed with a valve chamber 28 having communicating upper and lower cylindrical bores 29 and 31. Within the chamber 28 is formed a pair of cooperating valve seats 33 for a valve member 34, which is preferably of the tapered plug type. The valve member 34 is provided at its upper and lower extremities with cylindrical guide portions 36 and 37 which are adapted to reciprocate in substantially fluid-tight engagement with the bores 29 and 31 respectively. Suitable passages 38 connect the chamber 28 with the lower chamber of the housing 12, above and below the piston 17. It will be seen that the passages 38 and the chamber 28 constitute a by-pass between the ends of the lower portion of the cylinder through which the piston 17 is adapted to travel, and that the flow of fluid through this by-pass from one end of the cylinder to the other, such as is caused by movement of the piston 17, is controlled by the opening of the valve 34 in this by-pass.

Above the lug 27 is secured a detachable casing 41, defining, with the housing 12, a space which communicates with the upper guide bore 29. The shaft 23 projects into this space and is provided at its end therein with an upwardly disposed lever arm 42, which is preferably substantially equal in size to the arm 22. The end of the arm 42 is provided with a pin 43 on which is pivotally mounted a pendulum 44, the center of gravity of which is normally on the axis of the shaft 23. The upper end of this pendulum is pivotally connected, as at 46, to a link 47, the other end of which is pivoted as at 48 to the mid point or junction of a toggle having the arms 49 and 51. The upper end of the toggle arm 49 is pivotally mounted, as on a pin 52, to a lug or other suitable stationary abutment 53 on the casing 12. The lower end of the toggle arm 51 is pivotally connected, as at 54, with the upper end of the valve member 34 in any suitable way.

The operation of this mechanism will be evident. The lever arm 42 moves with the shaft 23, and has, at any given moment, a velocity and acceleration equal to the velocity and acceleration of the arm 22 and proportional to the velocity and acceleration of the vehicle spring. This arm carries with it the pendulum 44, which, by reason of its mass, has considerable inertia, so that it tends to lag behind the arm 42 during movement thereof in either direction. The friction of the valve guides 36 and 37 tends to keep the toggle arms 49 and 51 in a straight line, and if the acceleration of the arm 42 is low, then the inertia of the pendulum 44 is likewise low so that the link 47 will simply swing the pendulum on its pivot 46. If, however, the acceleration and inertia of the pendulum are sufficiently high, as upon a larger vehicle spring movement, sufficient force will be exerted on the toggle through the link 47 to move the toggle arms, or "break" the toggle, and this force, and hence the degree of movement of the toggle arms, is substantially proportional to the acceleration of the arm 42, and in turn of the vehicle spring 10. This movement of the toggle changes the position of the valve 34 so as to restrict the by-pass between the ends of the lower chamber to a greater or less degree. In this way, the resistance to flow of fluid through the by-pass, and consequently the damping effect of the shock absorber as a whole, is in proportion to the acceleration of the vehicle spring in either direction, upon initial compression or upon rebound.

It will be evident that this invention provides means for the damping of vibratory disturbances which is very sensitive, and which is particularly efficient in that the degree of control is proportional to the acceleration of the moving parts with respect to each other. This acceleration bears the most direct and simple relation to the force causing the disturbance so that the disturbance is checked at its inception before it has time to reach any appreciable magnitude. In this way, the prevention of resonance, or the increase in the disturbance by sympathetic vibration, is secured.

Since the pendulum 44 is so supported that the principal component of the movement of which it partakes is in a generally horizontal direction, it is obvious that upon rapid acceleration or deceleration of the vehicle the pendulum will swing to break the toggle 49, 51 and to thereby throttle the movement of fluid through the passage 38. This is of particular importance when the vehicle brakes are suddenly applied. Thus the tendency of the forward end of a vehicle to dip on application of the brakes is well-known, particularly when the vehicle is suspended by relatively soft springs. By means of the present arrangement the application of the brakes and the resulting rapid deceleration of the vehicle causes the pendulum 44 to swing, whereby the toggle 49, 51 breaks and the valve 34 is actuated to increase the resistance to flow of fluid through the passage 38. Consequently the movement of the piston 17 of the shock absorber is resisted and flexure of the vehicle spring is opposed.

It will be understood that various forms of the invention other than those described above may be used without departing from the spirit or scope of the invention. For instance, the specific method of connecting the shock absorbing device to the relatively moving parts of the vehicle which is described herein is wholly conventional and has been selected merely as a convenient method for illustration of the principles of the invention. The shock absorbing device which forms the gist of the invention may obviously be connected between any two parts of the vehicle which are subject to relative movement on passing over an irregular road bed, provided the relative movement of the parts in question is generally proportionate to the relative movement of what may be referred to as the sprung and unsprung portions of the vehicle.

Having thus described the invention, what is claimed as new and desired to be secured by Letters Patent is:

1. A damping device for vehicle springs comprising means connected between the vehicle and the spring to resist flexure of the latter, means for varying the resistance of the first said means, and an inertia device operable in response to all relative accelerative movements of the spring and vehicle in excess of a predetermined relative acceleration to control said second means.

2. A device for damping spring vibration in a motor vehicle having members relatively movable on flexure of the spring, comprising a hydraulic device operatively connected between said members across the spring and adapted to resist flexure thereof, valve means adapted to vary the resistance of said hydraulic device, and inertia means responsive to all relative accelerative movements of said members in excess of a predetermined relative acceleration to acuate the valve means.

3. A device for damping spring vibration in a motor vehicle suspension spring, comprising a hydraulic device acting at least in part in parallel with the spring, a rock shaft movable in response to flexure of the spring, an arm on the rock shaft, a pendulum on the arm, and a valve controlling said hydraulic device and connected to the pendulum to proportion the resistance of the hydraulic device to the spring deflection.

4. A damping device for vehicle springs comprising a closed cylinder connected to one portion of the spring, a piston therein connected to the other portion of the spring, means including a valve connecting the ends of the cylinder around the piston, toggle mechanism connected to the valve, and inertia means responsive to movements of the spring adapted to actuate said toggle mechanism and valve.

5. Apparatus for damping spring vibration in a motor vehicle having a wheel assembly and a frame, and spring means for supporting the frame on the wheel assembly, comprising a device for resisting flexure of said spring means, and means including an inertia member associated with said device and responsive to all relative accelerative movements of the frame and wheel assembly in excess of a predetermined relative acceleration for controlling the degree of resistance to spring flexure offered by said device.

6. Apparatus for damping spring vibration in a motor vehicle having a wheel member and a frame member, and spring means for supporting the frame member on the wheel member, comprising a device mounted on one of said members and having connections with the other of said members for resisting relative movement of said members, and means including an inertia member associated with said device and operable in response to accelerative movement of said connections on generally vertical movement of said frame and wheel members, only with respect to each other, for increasing the degree of resistance offered by said device.

7. In apparatus for damping vibrations, the combination with two relatively movable bodies, of a device carried by one of said bodies and having connection with the other of said bodies for resisting relative movement thereof, and means including an inertia member having connections with said device and operable in response to accelerative generally vertical movement of said bodies, only with respect to each other, for increasing the degree of resistance offered by said device to relative movement of the bodies.

8. In apparatus for damping vibrations, the combination with two relatively movable bodies, of a device associated with said bodies for resisting relative movement thereof, and means including an inertia member associated with said device and said bodies and responsive to generally vertical accelerative movement of said bodies, only with respect to each other, for controlling the degree of resistance offered by said means.

9. In apparatus for damping vibration in a motor vehicle having a wheel assembly and a frame, and resilient means for supporting the frame on the wheel assembly, the combination with a shock absorber, of means connecting the shock absorber to the frame and to the wheel assembly, and means mechanically coupled to said connecting means and operable in response to accelerative movement thereof on generally vertical movement of said wheel assembly and frame, only with respect to each other, for increasing the absorbing capacity of said shock absorber.

10. In apparatus for damping vibration in a motor vehicle having a wheel assembly and a frame, and resilient means for supporting the frame on the wheel assembly, the combination with a shock absorber, of means connecting the shock absorber to the frame and to the wheel assembly, and means operable by said connecting means in response to relative acceleration of said frame and wheel assembly for controlling the absorbing capacity of said shock absorber.

11. In apparatus for damping vibrations, the combination with two relatively movable bodies, of a device carried by one of said bodies and having connection with the other of said bodies for resisting relative movement thereof, and means including an oscillating weight member having connections with said device and operable in response to generally vertical movement of said bodies, only with respect to each other, for increasing the degree of resistance offered by said device to relative movement of the bodies.

12. In a shock absorber for motor vehicle springs, means for retarding motion of the spring in either direction from its neutral position, and means controlling the retarding means to produce a retarding effect substantially proportional to the acceleration of the spring, said last named means including an oscillating weight member supported for movement about an axis normally located substantially above the center of mass of said member.

13. In a shock absorber for motor vehicle springs, means for retarding motion of the spring in either direction from its neutral position, and means controlling the retarding means to produce a retarding effect substantially proportional to the acceleration of the spring, said last named means including an inertia member supported for movement only in directions of which the major component is substantially horizontal.

14. A damping device for vehicle springs comprising means connected in parallel with at least a part of the spring to resist flexure of the latter, means for varying the resistance of the first said means, and inertia means operable in response to all relative accelerative movements of the spring and vehicle in excess of a predetermined relative acceleration to control said second means, said inertia means including a weight member supported for movement in a path generally parallel to the road bed.

15. In a shock absorber for motor vehicle springs, means for resisting motion of the spring, and means controlling the resisting means to vary the degree of resistance offered thereby to spring motion, said last named means including an inertia member supported for movement in a direction of which the major component is substantially horizontal.

16. In a shock absorber for motor vehicle springs, means for resisting motion of the spring, and means controlling the resisting means to vary the degree of resistance offered thereby to spring motion, said last named means including a device responsive to sudden alteration in the forward speed of the vehicle.

17. In a shock absorber for motor vehicle springs, means for resisting motion of the spring, and means controlling the resisting means to vary the degree of resistance offered thereby to spring motion, said last named means including a device operable automatically when the forward motion of the vehicle is retarded to control said first named means to increase the degree of resistance offered thereby to spring motion.

18. In apparatus for use with spring suspensions of motor vehicles, the combination with a fluid shock absorber operable to retard vehicle spring flexure, of fluid throttling means associated with said shock absorber and controllable to regulate the retarding effect of said shock absorber, and means including a device associated with said throttling means and operable automatically when the forward speed of the vehicle is rapidly decreased to control said throttling means for increasing the retarding effect of the shock absorber.

19. In a shock absorber for motor vehicle springs, means for resisting motion of the spring, and means controlling the resisting means to vary the degree of resistance offered thereby to spring motion, said last named means including a device actuated upon retardation of the forward motion of the vehicle to control said first named means to increase the degree of resistance offered thereby to spring motion.

WALTER R. GRISWOLD.